United States Patent
Chen et al.

(10) Patent No.: US 10,133,510 B2
(45) Date of Patent: Nov. 20, 2018

(54) APPARATUS, METHOD, AND PROGRAM PRODUCT FOR DATA INTEGRITY DURING ASYNCHRONOUS REMOTE COPY

(71) Applicant: International Business Machines Corporation, Armonk, NY (US)

(72) Inventors: Duo Chen, Shanghai (CN); Jialin Feng, Shanghai (CN); Dan Liu, Shanghai (CN); Yuan Li, Shanghai (CN); Ning Min Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/410,435

(22) Filed: Jan. 19, 2017

(65) Prior Publication Data
US 2018/0203607 A1    Jul. 19, 2018

(51) Int. Cl.
*G06F 12/00*    (2006.01)
*G06F 3/06*    (2006.01)

(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | |
|---|---|---|
| 6,591,351 B1 | 7/2003 | Urabe et al. |
| 7,600,089 B2 | 10/2009 | Muto et al. |
| 7,603,581 B2 | 10/2009 | Boyd et al. |
| 7,627,775 B2 | 12/2009 | Kern et al. |
| 7,734,950 B2 | 6/2010 | Rogers |
| 7,966,463 B2 | 6/2011 | Mizuta et al. |
| 8,392,688 B2 * | 3/2013 | Fujibayashi .......... G06F 3/0613 711/170 |
| 2015/0227431 A1 * | 8/2015 | Fiske ................... G06F 11/1471 711/162 |
| 2017/0344618 A1 * | 11/2017 | Horowitz ............ G06F 11/0709 |

OTHER PUBLICATIONS

"New Monster 3PAR + New Reatures Announced", 3PARDUDE, A journey to HP 3Par excellence, https://3pardude.com/tag/synchronous-streaming/, Jun. 1, 2015, 4 pages.

* cited by examiner

*Primary Examiner* — Prasith Thammavong
*Assistant Examiner* — Jason W Blust
(74) *Attorney, Agent, or Firm* — Kunzler, PC

(57) ABSTRACT

A system, method, and program product are disclosed for asynchronous remote copy. One method includes transmitting a write request to a remote primary storage cluster for an asynchronous remote copy operation. The method also includes creating an entry in a write record stored in the local memory, the entry comprising a data consistency value, and removing the entry from the write record in response to receiving an acknowledgement from a remote secondary storage cluster that the asynchronous remote copy operation is completed.

14 Claims, 7 Drawing Sheets

US 10,133,510 B2

APPARATUS, METHOD, AND PROGRAM PRODUCT FOR DATA INTEGRITY DURING ASYNCHRONOUS REMOTE COPY

FIELD

The subject matter disclosed herein relates to asynchronous remote copy, and more particularly relates to maintaining data integrity during asynchronous remote copies.

BACKGROUND

Data replication or data backups may be used to replicate data such that a backup of the data is maintained to aid in data recovery. A copy of the data may be stored on two or more storage devices. Each storage device may be located in geographically diverse locations.

BRIEF SUMMARY

A system for asynchronous remote copy is disclosed. In particular, the system utilizes the local cache of a host to store write operations until receiving an acknowledgement from both primary and secondary storage clusters that the write operation is complete. A method and computer program product also perform the functions of the system. In one embodiment, the apparatus includes at least one computing device and at least one software module that are together configured for performing the method, where the at least one computing device includes a processor and a local memory. The method includes transmitting a write request to a remote primary storage cluster for an asynchronous remote copy operation, creating an entry in a write record stored in the local memory, the entry comprising a data consistency value; and removing the entry from the write record in response to receiving an acknowledgement from a remote secondary storage cluster that the asynchronous remote copy operation is completed.

In one embodiment, the method includes updating the data consistency value in response to receiving an acknowledgement from the remote primary storage cluster that the write operation is completed, or, updating the data consistency value in response to receiving an acknowledgement from the remote secondary storage cluster that the write operation is completed. In one embodiment, the data consistency value indicates a status of the write request, the status indicative of one of: a sent status, a pending write status, an executed write status by the remote primary storage cluster, or an executed write status by the remote secondary storage cluster.

In one embodiment, the method also includes monitoring data consistency values in the write record, and determining a host throughput, a remote primary storage controller throughput, and a remote secondary controller throughput in response to the monitoring. The method may also include increasing a size of the write record in the local memory in response to a comparison, with a threshold, of at least two of: the host throughput, the remote primary storage controller throughput, or the remote secondary controller throughput. In another embodiment, the method includes decreasing a size of the write record in the local memory in response to a comparison of at least two of: the host throughput, the remote primary storage controller throughput, or the remote secondary controller throughput. In a further embodiment, the method includes decreasing the size of the write record further comprises decreasing the size of the write record in response to a determination that the remote secondary controller throughput is greater than the host throughput.

In one embodiment, the computer program product includes a computer readable storage medium having program instructions embodied therewith. The program instructions, in some embodiments, are executable by a processor to cause the processor to execute the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
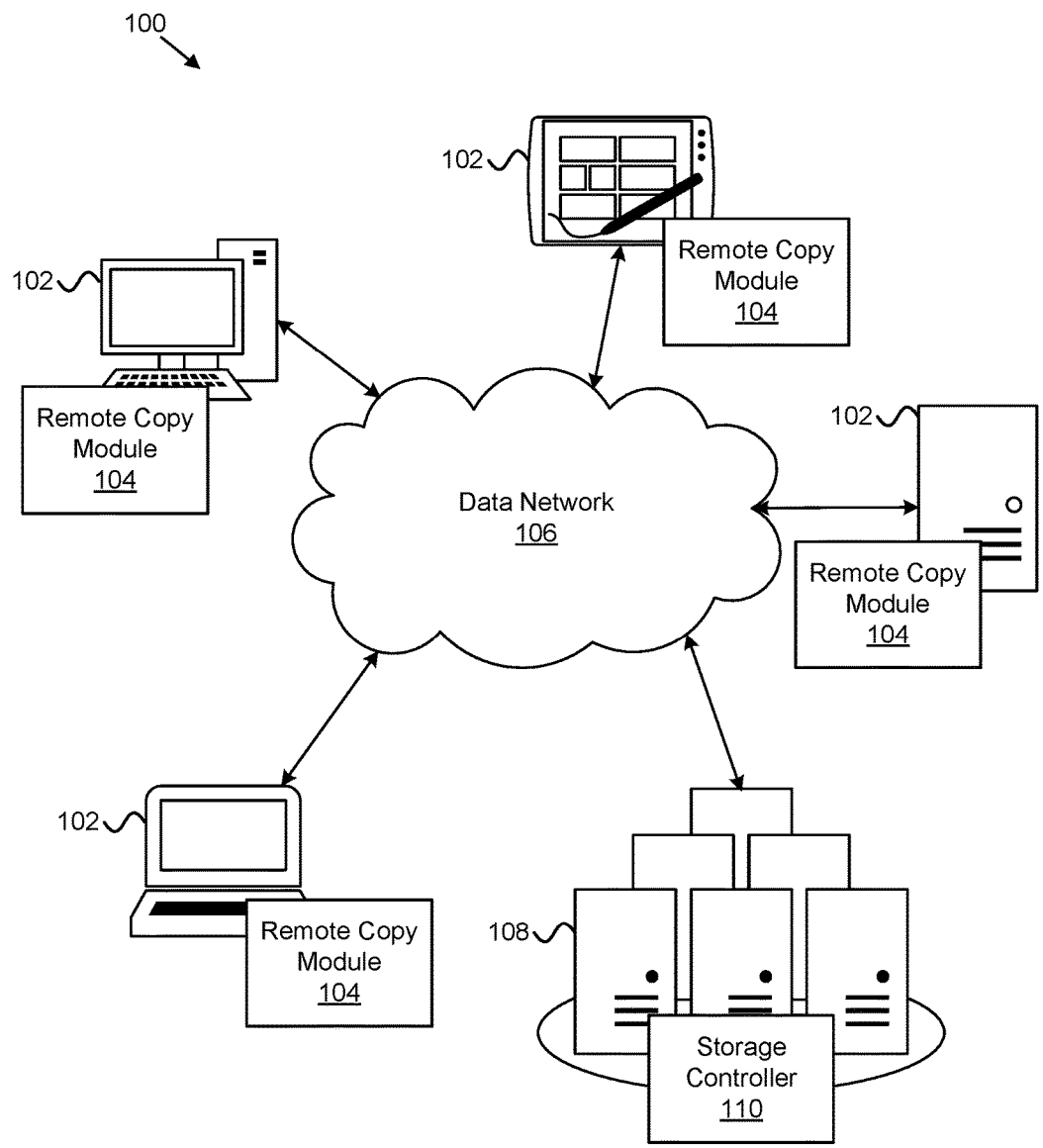
FIG. 1 is a schematic block diagram illustrating one embodiment of a system for asynchronous remote copy in accordance with one embodiment of the present disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for asynchronous remote copy. In one embodiment, the system 100 includes information handling devices 102 (also referred to as "hosts"), remote copy modules 104, and data networks 106. Even though a particular number of information handling devices 102, remote copy modules 104, and data networks 106 are depicted in the system 100 of FIG. 1, one of skill in the art will recognize that any number or configuration of information handling devices 102, remote copy modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous access to stored data. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM") or cache, serial advanced technology attachment ("SATA") devices, tape devices, tape readers, or the like. In some embodiments, the information handling devices 102 are in communication via one or more data networks 106, described below.

In one embodiment, each remote copy module 104 is configured to perform write operations on a first storage cluster 108. Although not depicted here, the system 100 may include two or more storage clusters. Each storage cluster 108 may include a storage controller 110. The remote copy module 104, in one embodiment, is configured to send write operations to the storage cluster 108, and maintain a write record in the local cache of the information handling device 102 until an acknowledgement is received from each storage cluster that is making a copy of the write operations. This will be discussed in greater detail below with reference to FIGS. 2-4.

As may be appreciated, the remote copy module 104 may be used in any suitable asynchronous remote copy system 100. In certain embodiments, the remote copy module 104 includes multiple modules that perform the operations of the remote copy module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
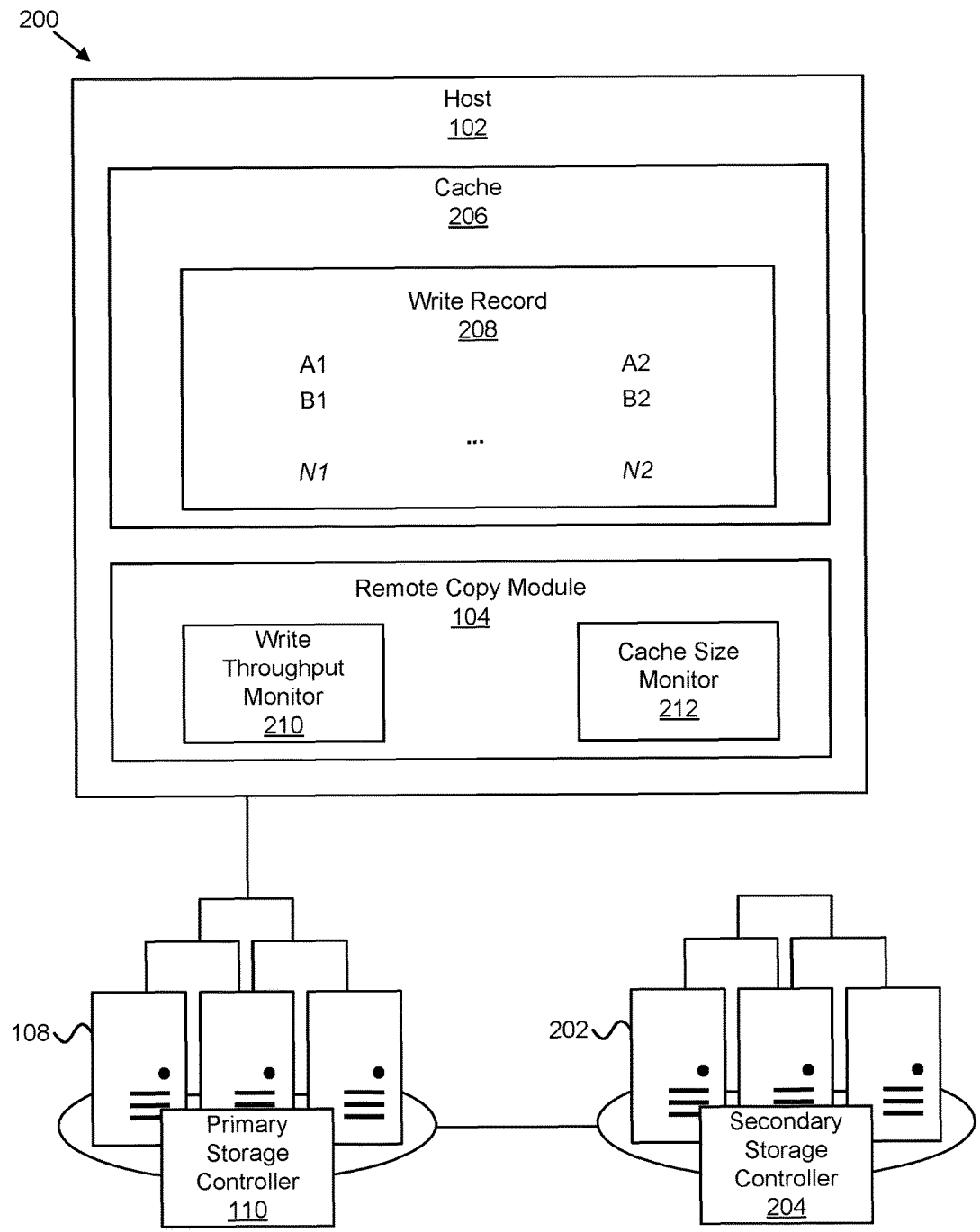
FIG. 2 is a schematic block diagram illustrating another embodiment of a system for asynchronous remote copy in accordance with embodiments of the present disclosure.

FIG. 2 is a schematic block diagram illustrating another embodiment of a system for asynchronous remote copy in accordance with embodiments of the present disclosure. The host 102, primary storage cluster 108, and primary storage controller 110 may be similar to those described above with reference to FIG. 1. In the depicted embodiment, the host 102 communicates with the primary storage cluster 108 and is configured to send I/O requests to the primary storage cluster 108. As known to those of skill in the art, the primary storage controller 110 may be configured to mirror or copy the write requests from the host 102 to a secondary storage cluster 202. This mirroring may be performed after the write request has been performed by the primary storage cluster 108, and for this reason is referred to as an "asynchronous" copy.

Mirroring or copying data to a secondary storage system from a primary storage system is currently employed to minimize the time in which access to data is lost due to a disaster. A remote copy system, as depicted in FIG. 2, is a hardware based disaster recovery solution designed to maintain a mirror image of application data at a second remote location. This mirror image, or copy, is kept current with the data located in the primary storage location. It is the duty of the primary storage controller 110 to send all write requests to the secondary storage controller 204. Asynchronous remote copy systems allow the host device 102 to continue processing data without waiting for an acknowledgement that data has been written to both the primary and secondary storage clusters 108, 202. This is beneficial because often the time to process a write request at a second, remote location, is detrimental to the performance of an application processing data on the host 102.

The host 102, in certain embodiments, includes the remote copy module 104 described above, and various other components that are not described here but are described above. The remote copy module 104 is configured to execute I/O requests between the host 102 and the primary storage cluster 108. Although a direct connection between the host 102 and the primary storage cluster 108 is depicted in FIG. 2, it is to be understood that this communication channel may exist over the data network 106 of FIG. 1. Similarly, the host 102 may communicate directly with the secondary storage cluster 202 in the event of a hardware failure of the primary storage cluster 108.

The remote copy module 104, in one embodiment, is configured to maintain, in a cache 206 of the host 102, a write record 208. The write record 208 may be a table of entries (e.g., A, B, . . . , N) that includes an entry for each write operation that the remote copy module 104 sends to the primary storage cluster 108. Each entry A, B, N, may include at least two components: a copy of the delta data A1, B1, N1 (i.e., the new data to be written) and a data consistency value A2, B2, N2. Examples of data consistency values include, but are not limited to, "host," "sent," "pending write," "acked primary," "acked secondary," "delete," etc. In other words, the data consistency value is an indication of the current state of the delta data, whether it has been sent, received by the primary storage cluster, received by the secondary storage cluster, etc. In a further embodiment, and as will be described below in greater detail, the data consistency value may also include a sequence number that corresponds to a data write operation of the same delta data by a different host device (see FIG. 3).

In one embodiment, the remote copy module 104 is configured to adjust a size of the write record 208 in the cache 206. Stated differently, the remote copy module 104 is configured to extend or reduce the size of the cache that the write record 208 occupies. To accomplish this, the remote copy module 104 may include a write throughput monitor 210 and a cache size monitor 212. The write throughput monitor 210 is configured to monitor the write throughput of write requests to either the primary storage cluster or the secondary storage cluster. In one embodiment, the write throughput monitor 210 determines a host write throughput, a primary storage cluster write throughput, and a secondary storage cluster write throughput. The host write throughput, in one example, is determined by measuring the cache consumption, in the host 102, of the write request for a period of time. In one example, this might be determined by identifying all of the entries in the write record with data consistency values associated with "host", and monitoring the size of the identified entries over time. In another embodiment, the host write throughput may be determined by determining the amount of time a single data consistency value in the write record 208 is set to "host."

The primary storage cluster write throughput may be determined, by the write throughput monitor 210, by measuring the cache consumption of a write request with data consistency values related to "primary storage cluster" (e.g., "sent to primary," "acked by primary," etc.). Like described above, the primary storage cluster write throughput may be determined, over time, the size of all entries with data consistency values related to the primary storage cluster. Or, alternatively, the length of time a single entry in the write record has a value related to the primary storage cluster. For example, the time required to send data of known size to the primary storage cluster and receive an acknowledgement that the primary storage cluster has executed the write request. The secondary storage cluster write throughput may be calculated in a similar manner.

The cache size monitor 212 is configured to increase or reduce the write record 208 cache consumption in response to the measured write throughputs. In one embodiment, the cache size monitor 212 compares the host write throughput with the secondary write throughput and determines if this exceeds a warning threshold. For example, if this comparison exceeds a threshold of 80%, then the cache size monitor 212 extends the cache consumption of the write record. In one embodiment, the comparison of the host write throughput to the secondary write throughput may be expressed as the following ratio:

$$\frac{\text{host write throughput} - \text{secondary write throughput}}{\text{remanent cache}}.$$

The cache size monitor 212 is similarly configured to reduce the size of the cache consumption by comparing the secondary write throughput to the host write throughput. In one embodiment, the comparison may be a determination that the secondary write throughput is greater than the host write throughput. If the secondary write throughput is greater, then the cache size monitor 212 is configured to reduce the host cache consumption.

Figure 3:
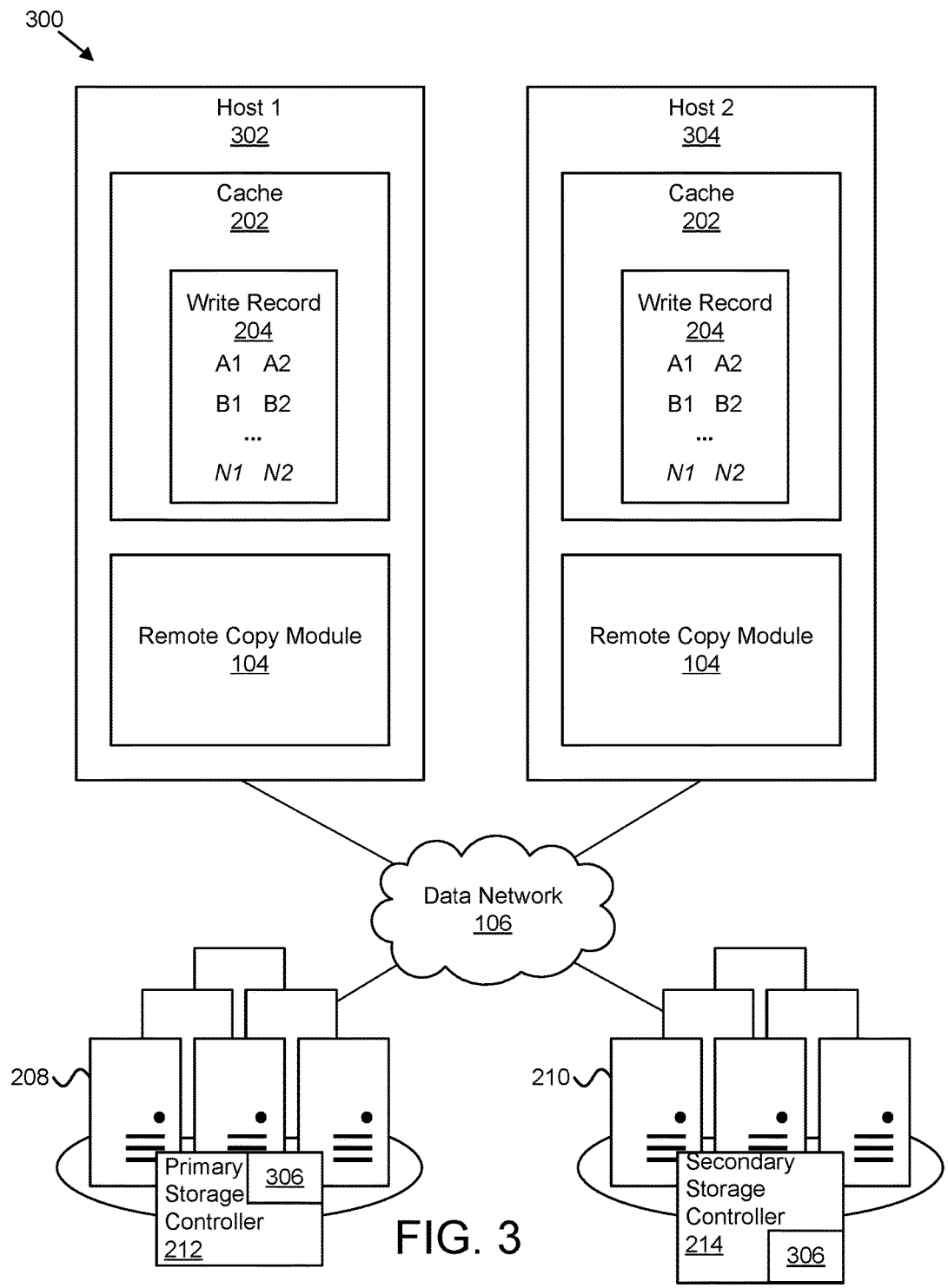
FIG. 3 is a schematic block diagram illustrating another embodiment of an asynchronous remote copy system in accordance with embodiment of the present disclosure.

FIG. 3 is a schematic block diagram illustrating another embodiment of an asynchronous remote copy system 300 in accordance with embodiment of the present disclosure. The depicted system 300 is an example of a multi-host system 302, 304 that share the same storage clusters 208, 210. The hosts 302, 304 may communicate over a data network 106, as described above with reference to FIG. 1. In some embodiments, the storage controllers 212, 214 of the storage clusters 208, 210 may be configured with a sequence map 306. The sequence map 306 may be configured as a table of entries of updates to a single logical portion of the storage cluster. For example, the sequence map 306 may maintain an indication of write requests to single extent, section, partition, etc.

While the primary storage cluster 208 is operating normally, host 1 and host 2 are configured to direct write requests to the primary storage cluster 208. The controller 212 of the primary storage controller 208 is configured to acknowledge when a write request is completed, as described above. In a further embodiment, the storage controller 212 may respond with an acknowledgement that includes a sequence number. For example, "primary acked, sequence 1" to indicate that the delta data has been written, and it is the first time it is written. If host 2 sends the same delta data to be written to the same extent, the storage controller will respond with "primary acked, sequence 2", and will update the sequence map 306 with the new sequence number. The storage controller 212 is configured to send the sequence map 306 to the secondary storage controller 214 when performing the remote copy to the secondary storage cluster 210.

In the event that the primary storage cluster 208 experiences a hardware failure, both host 1 and host 2 are configured to direct I/O requests to the secondary storage cluster 210 which takes over the role of the primary storage cluster 208. The secondary storage controller 214 will update the sequence map 306 as write requests are performed. Additionally, because the cache 202 of the hosts 302, 304 contain the write requests that have not been acknowledged by the secondary storage cluster, these write requests can now be destaged directly to the secondary storage cluster according to the latest sequence number.

Figure 4:
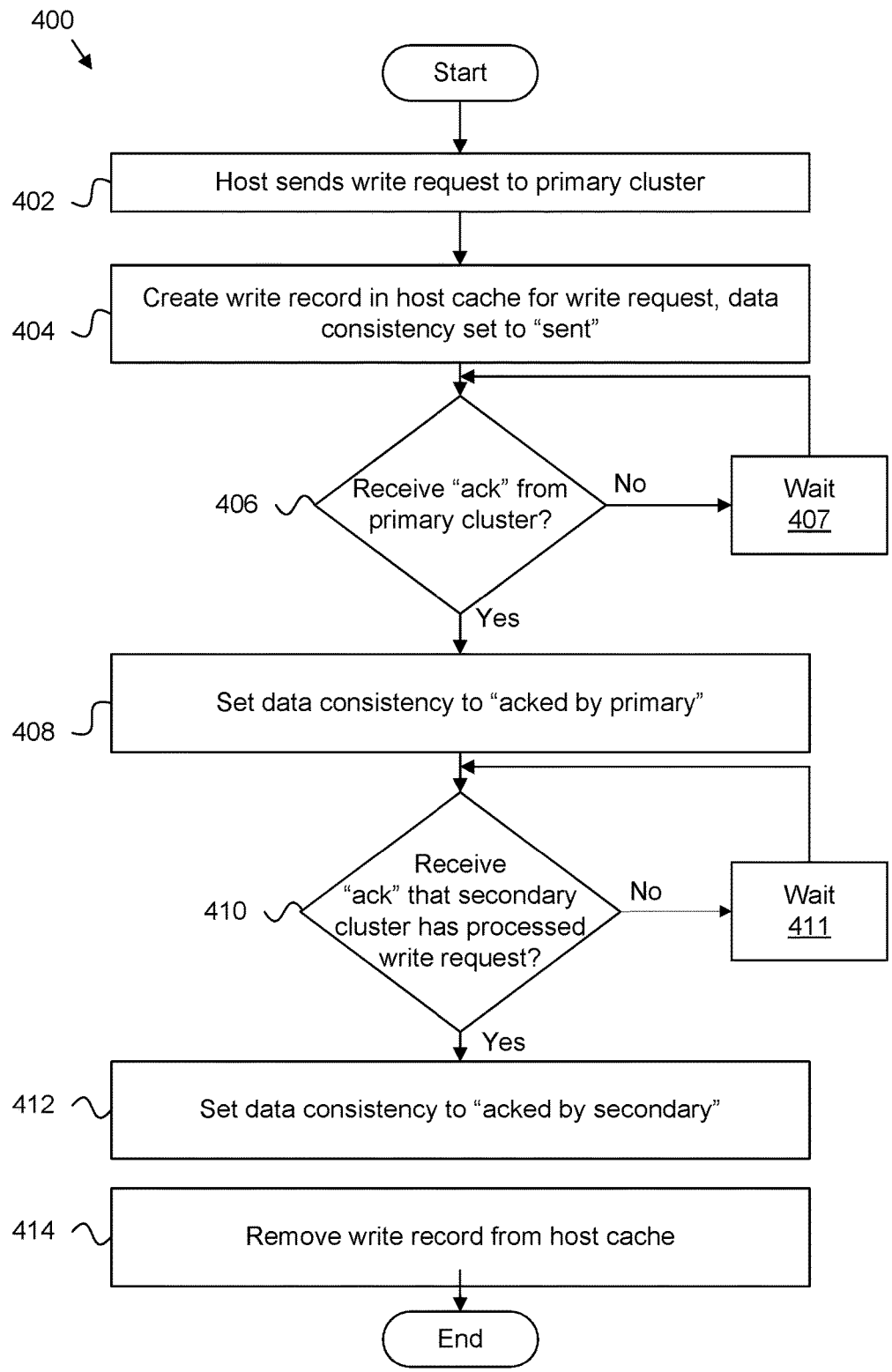
FIG. 4 is a schematic flow chart diagram illustrating one embodiment of a method for asynchronous remote copy of a single host in accordance with embodiments of the present disclosure.

FIG. 4 is a schematic flow chart diagram illustrating one embodiment of a method 400 for asynchronous remote copy of a single host in accordance with embodiments of the present disclosure. The method 400 starts and the host sends 402 a write request to the primary storage cluster. The host also creates 404 an entry in the write record that corresponds to the write request, and simultaneously updates the data consistency value. In one embodiment, the data consistency value may be set to one of any number of possible values, including but not limited to, "host processing," "sent," "primary acked," "secondary acked," "marked for deletion," etc. In this example, the remote copy module of the host sets the data consistency value to "sent."

At decision block 406, the remote copy module waits 407 for a response from the primary storage cluster indicating that the write operation has been executed. If yes, the remote copy module updates 408 the write record with a value that indicates the acknowledgement has been received. The method continues and the remote copy module waits 411 for an acknowledgement from the secondary storage cluster at decision block 410. As above, the remote copy module sets the data consistency value to, for example, "acked by secondary," at which point the host or the remote copy module may remove 414 the entry from the write record, and the method 400 ends.

Maintenance operations, such as extending and reducing the size of the cache, may be performed at any point within the method 400, and will be described in greater detail below with reference to FIGS. 6 and 7. Alternatively, the maintenance operations may be performed at set intervals, including for example, set times, etc. In another embodiment, the operation to extend the cache may be performed before every $10^{th}$, for example, write operation.

Figure 5:
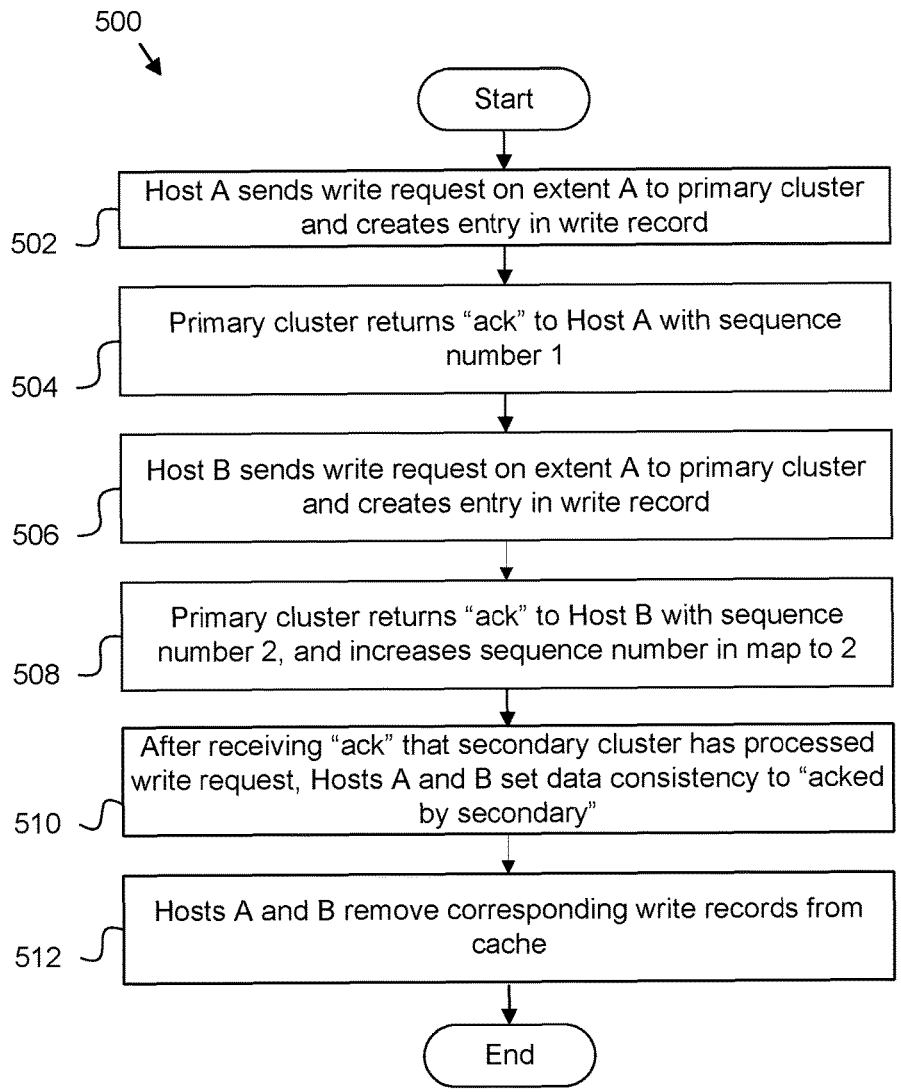
FIG. 5 is a schematic flow chart diagram illustrating one embodiment of a method for asynchronous remote copy of multiple hosts in accordance with embodiments of the present disclosure.

FIG. 5 is a schematic flow chart diagram illustrating one embodiment of a method 500 for asynchronous remote copy of multiple hosts in accordance with embodiments of the present disclosure. The method 500 starts and the first host ("host A") sends 502 a write request to be performed on a logical portion of the primary storage controller (e.g., extent A). The remote copy module of host A also creates an entry in the write record of host A. As described above, the entry in the write record corresponds to the write request (i.e., includes the delta data) and includes a data consistency value. In a multi-host system, this data consistency value may also include an initialized value of a sequence number (e.g., "0") as described above. Upon receiving 504 an acknowledgement from the primary storage controller, the remote copy module updates 504 the entry in the write record with a data consistency value that indicates the sequence number and that the write request has been executed (e.g., "acked by primary, SN 1").

At block 506, host B sends a write request to the primary storage controller on extent A and also creates an entry in the write record. The remote copy module of host B waits for a response at block 508, and upon receipt, updates the entry in the write record with a data consistency value that is indicative of a successful write operation, and a corresponding sequence number (e.g., "acked by primary, SN 2").

Each time the primary storage controller executes a write request on extent A, the primary storage controller increments the corresponding sequence number in the sequence map. Additionally, when the primary storage controller sends the write requests to the secondary storage cluster, the primary storage controller also sends an updated sequence map, or alternatively, updates to the sequence map.

After receiving, at block 510, acknowledgement that the secondary data cluster has processed the write request, hosts A and B update the corresponding data consistency values in the write record to a value indicative of acknowledgement by the secondary storage cluster. Once the data has been copied to the secondary storage cluster, and acknowledged, hosts A and B, at block 512, can remove the corresponding entries from the write record, and reduce the cache size if needed (see FIG. 7).

Figure 6:
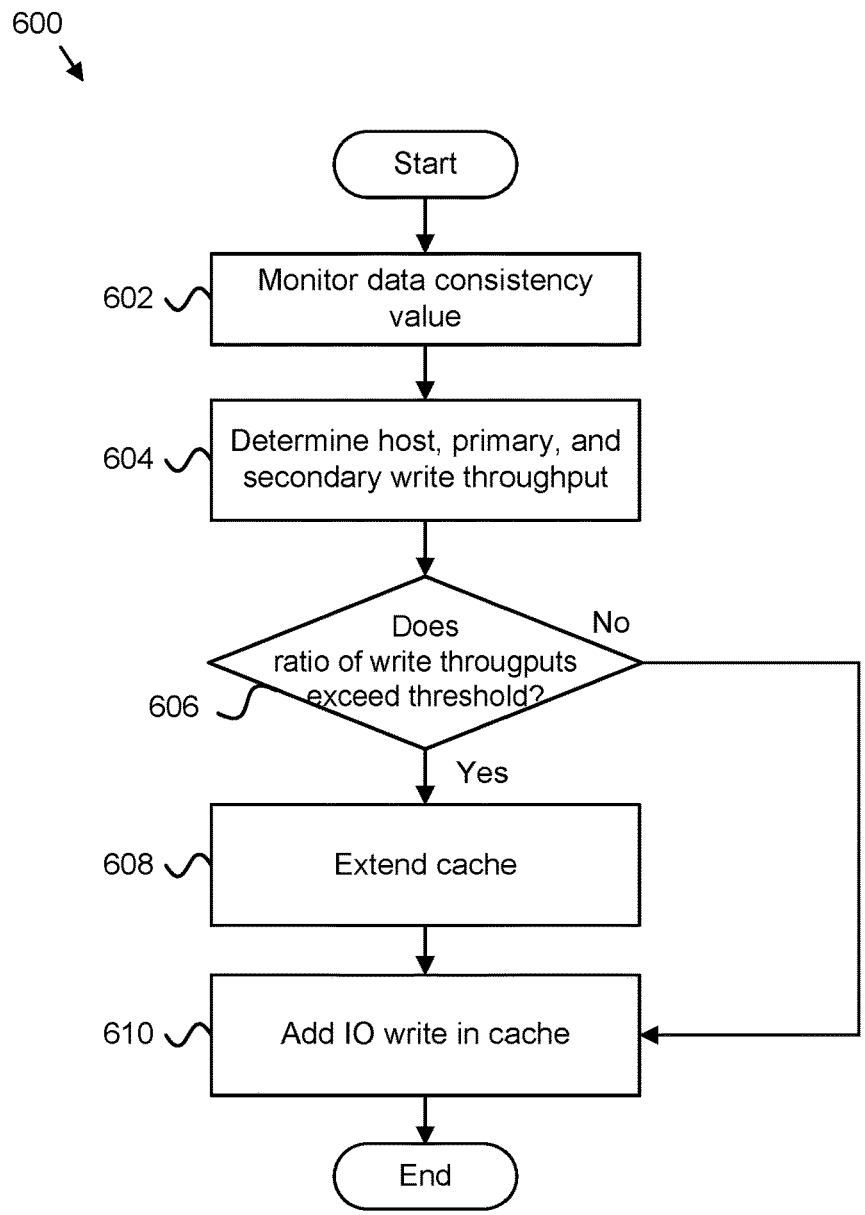
FIG. 6 is a schematic flow chart diagram illustrating one embodiment of a method for increasing a host cache consumption in an asynchronous remote copy system in accordance with embodiments of the present disclosure.

FIG. 6 is a schematic flow chart diagram illustrating one embodiment of a method 600 for increasing a host cache consumption in an asynchronous remote copy system in accordance with embodiments of the present disclosure. In one embodiment, the method 600 starts and the write throughput monitor, at block 602, monitors data consistency values and determines, at block 604, the throughput values. As described above with reference to FIG. 2, the write throughput monitor evaluates the host, primary, and secondary write throughputs using any suitable metric. In one embodiment, the write throughput monitor may identify how long a data consistency value remains unchanged, and together with the size of a write request, may determine a throughput.

The write throughput monitor may, at block 606, determine if a ratio of write throughputs exceeds a threshold. For example, the write throughput monitor may determine if a secondary storage throughput subtracted from a host throughput, and divided by the remnant cache exceeds a threshold. If yes, the cache size monitor extends, at block 608, the cache. If no, the method ends, or the remote copy module adds, at block 610, a write entry in to the write record.

Figure 7:
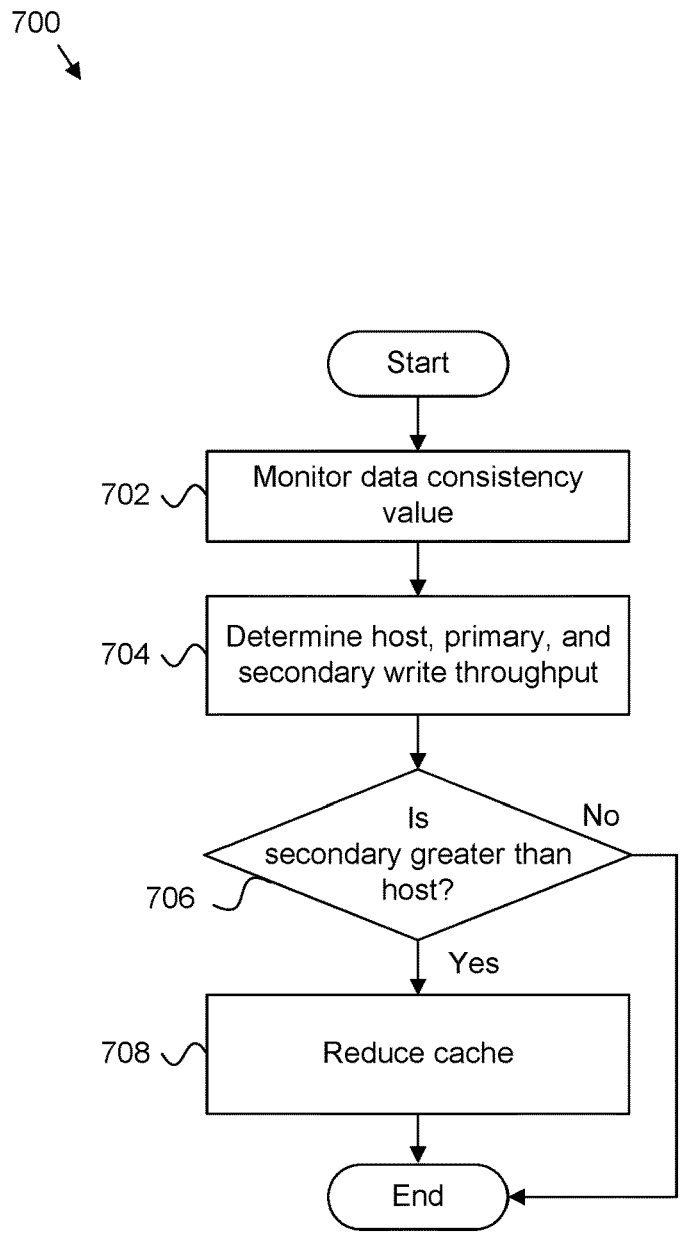
FIG. 7 is a schematic flow chart diagram illustrating one embodiment of a method for reducing a host cache consumption in an asynchronous remote copy system in accordance with embodiments of the present disclosure.

FIG. 7 is a schematic flow chart diagram illustrating one embodiment of a method 700 for reducing a host cache consumption in an asynchronous remote copy system in accordance with embodiments of the present disclosure. The method 700 starts and the write throughput monitor, at block 702, monitors data consistency values to determine, at block 704, host, primary and secondary write throughputs. The different avenues available for calculating a throughput were discussed above with reference to FIG. 2.

At decision block 706, the write throughput monitor determines if the secondary storage controller write throughput is greater than the host write throughput. If the determination is yes, the cache size monitor reduces, at block 708, the cache consumption of the write record at which point the method 700 ends. If the determination is no, then the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising at least one computing device and at least one software module that are together configured for performing actions, where the at least one computing device includes a processor and a local memory, the actions comprising:
    transmitting a write request to a remote primary storage cluster for an asynchronous remote copy operation;
    creating an entry in a write record stored in the local memory, the entry comprising a data consistency value;
    removing the entry from the write record in response to receiving an acknowledgement from a remote secondary storage cluster that the asynchronous remote copy operation is completed;
    monitoring data consistency values in the write record;
    determining a host throughput, a remote primary storage controller throughput, and a remote secondary controller throughput in response to the monitoring; and
    increasing a size of the write record in the local memory in response to a comparison, with a threshold, of at least two of: the host throughput, the remote primary storage controller throughput, or the remote secondary controller throughput.

2. The system of claim 1, where the actions further comprise updating the data consistency value in response to receiving an acknowledgement from the remote primary storage cluster that the write operation is completed.

3. The system of claim 1, where the actions further comprise updating the data consistency value in response to receiving an acknowledgement from the remote secondary storage cluster that the write operation is completed.

4. The system of claim 1, where the data consistency value indicates a status of the write request, the status indicative of one of: a sent status, a pending write status, an executed write status by the remote primary storage cluster, or an executed write status by the remote secondary storage cluster.

5. The system of claim 1, where the actions further comprise decreasing a size of the write record in the local memory in response to a comparison of at least two of: the host throughput, the remote primary storage controller throughput, or the remote secondary controller throughput.

6. The system of claim 5, where the decreasing the size of the write record further comprises decreasing the size of the write record in response to a determination that the remote secondary controller throughput is greater than the host throughput.

7. A method for asynchronous remote copying, comprising:
    transmitting a write request to a remote primary storage cluster for an asynchronous remote copy operation;
    creating an entry in a write record stored in the local memory, the entry comprising a data consistency value;
    removing the entry from the write record in response to receiving an acknowledgement from a remote secondary storage cluster that the asynchronous remote copy operation is completed;
    monitoring data consistency values in the write record;
    determining a host throughput, a remote primary storage controller throughput, and a remote secondary controller throughput in response to the monitoring; and
    increasing a size of the write record in the local memory in response to a comparison, with a threshold, of at least two of: the host throughput, the remote primary storage controller throughput, or the remote secondary controller throughput.

8. The method of claim 7, further comprising updating the data consistency value in response to receiving an acknowledgement from the remote primary storage cluster that the write operation is completed.

9. The method of claim 7, further comprising updating the data consistency value in response to receiving an acknowledgement from the remote secondary storage cluster that the write operation is completed.

10. The method of claim 7, where the data consistency value indicates a status of the write request, the status indicative of one of: a sent status, a pending write status, an executed write status by the remote primary storage cluster, or an executed write status by the remote secondary storage cluster.

11. The method of claim 7, further comprising decreasing a size of the write record in the local memory in response to a comparison of at least two of: the host throughput, the remote primary storage controller throughput, or the remote secondary controller throughput.

12. The method of claim 11, where the decreasing the size of the write record further comprises decreasing the size of the write record in response to a determination that the remote secondary controller throughput is greater than the host throughput.

13. A computer program product for asynchronous remote copy, the computer program product comprising a computer readable storage medium having program instructions embodied therewith, the program instructions executable by a processor to cause the processor to:
    transmit a write request to a remote primary storage cluster for an asynchronous remote copy operation;
    create an entry in a write record stored in the local memory, the entry comprising a data consistency value;
    remove the entry from the write record in response to receiving an acknowledgement from a remote secondary storage cluster that the asynchronous remote copy operation is completed;
    monitor data consistency values in the write record;
    determine a host throughput, a remote primary storage controller throughput, and a remote secondary controller throughput in response to the monitoring; and
    increase a size of the write record in the local memory in response to a comparison, with a threshold, of at least two of: the host throughput, the remote primary storage controller throughput, or the remote secondary controller throughput.

14. The computer program product of claim 13, where the data consistency value indicates a status of the write request, the status indicative of one of: a sent status, a pending write status, an executed write status by the remote primary storage cluster, or an executed write status by the remote secondary storage cluster.

* * * * *